United States Patent
Liao et al.

(10) Patent No.: US 6,883,175 B2
(45) Date of Patent: Apr. 19, 2005

(54) DYNAMIC VIBRATION ABSORBING APPARATUS FOR AN OPTICAL DISK DRIVE

(75) Inventors: Cheng-Yao Liao, Taipei (TW); Tzu-Nan Chen, Taipei (TW)

(73) Assignee: Lite-On It Corporation, Taipei (TW)

(*) Notice: Subject to any disclaimer, the term of this patent is extended or adjusted under 35 U.S.C. 154(b) by 0 days.

(21) Appl. No.: 10/818,161

(22) Filed: Apr. 5, 2004

(65) Prior Publication Data

US 2004/0194121 A1 Sep. 30, 2004

Related U.S. Application Data

(62) Division of application No. 10/281,598, filed on Oct. 28, 2002, now Pat. No. 6,823,527.

(30) Foreign Application Priority Data

Feb. 22, 2002 (TW) ........................................ 91202180 U

(51) Int. Cl.⁷ .......................... G11B 25/04; G11B 33/08
(52) U.S. Cl. ....................................... 720/692; 360/694
(58) Field of Search ................................ 720/692, 694; 369/247, 263; 360/97.02

(56) References Cited

U.S. PATENT DOCUMENTS

| | | | | |
|---|---|---|---|---|
| 4,719,526 A | * | 1/1988 | Okita et al. | 369/77.2 |
| 4,922,478 A | * | 5/1990 | Verhagen | 369/247 |
| 5,737,304 A | * | 4/1998 | Soga et al. | 369/247 |
| 5,864,533 A | * | 1/1999 | Yamada et al. | 369/247 |
| 5,956,314 A | * | 9/1999 | Ishimatsu et al. | 369/247 |
| 6,324,153 B1 | * | 11/2001 | Furukawa et al. | 369/263 |
| 6,683,840 B1 | * | 1/2004 | Shin | 369/247 |

FOREIGN PATENT DOCUMENTS

| | | | | |
|---|---|---|---|---|
| JP | 08212770 A | * | 8/1996 | G11B/33/08 |
| JP | 02000182308 | * | 6/2000 | G11B/17/04 |

* cited by examiner

*Primary Examiner*—Brian E. Miller
(74) *Attorney, Agent, or Firm*—Thomas, Kayden, Horstemeyer & Risley

(57) ABSTRACT

A dynamic vibration absorbing apparatus for an optical disk drive. The dynamic vibration absorbing apparatus has a first plate, a second plate provided either above or under the first plate, a plurality of first plate supporting devices, and a plurality of vibration absorbing dampers, in which each of the vibration absorbing dampers is provided between the first plate and each of the first plate supporting devices and between the first plate and the second plate.

3 Claims, 3 Drawing Sheets

DYNAMIC VIBRATION ABSORBING APPARATUS FOR AN OPTICAL DISK DRIVE

CROSS-REFERENCE TO RELATED APPLICATION

This application is a division of U.S. application Ser. No. 10/281,598, filed on Oct. 28, 2002 now U.S. Pat. No. 6,823,527.

BACKGROUND OF THE INVENTION

1. Field of the Invention

The present invention relates to a dynamic vibration absorbing apparatus for an optical disk drive, and particularly to a dynamic vibration absorbing apparatus that absorbs vibration due to an unbalanced disk at high rotational speeds in the optical disk drive.

2. Description of the Prior Art

Since optical media technology has rapidly improved in recent years, various kinds of optical disk drives are involved in applications as computer peripherals. Presently, most commercially available optical disk drives are made to operate with the rotational speed of their spindle motor over 10000 rpm.

However, it is possible that the optical disk loaded into an optical disk drive may be eccentric. When both the eccentric disk and the spindle motor of the optical disk drive is operated at a relatively high rotational speed, centrifugal force due to imbalance of the eccentric disk increases and may lead to vibration or noise. The vibration creates instability that impairs the optical pickup head of the optical disk drive, so that error occurs in data readout, and the noise can be annoying or even hazardous to the user. Furthermore, reading data from unstable optical disk may also result in the deterioration of the performance of the optical disk drive. Accordingly, elimination of vibration and noise at high rotational speeds is a major concern for manufacturers.

Conventionally, there are three methods to reduce vibration and noise in optical disk drives at high rotational speeds due to imbalance of the optical disk.

In one conventional method, extra weight is applied to the data readout device (i.e. the "mecha") of the optical disk drive. This method directly increases the weight of the optical disk drive and attempts to reduce vibration. Unfortunately, vibration cannot be significantly reduced.

Another method of reducing the vibration of the optical disk drive uses an additional auto-balancing system in the optical disk drive. In the auto-balancing system, a balancing component is applied to balance the eccentric disk. In practical use, however, this method is limited by the manufacturing factors such as concentricity or roughness, and it is not possible to apply a specific balancing component to deal with vibration and noise due to various types of eccentric disks. Obviously, many specific components need to accomplish this and cause more cost.

The third method applies a dynamic vibration absorber in accordance with vibration theory to the optical disk drive. The dynamic vibration absorber includes an elastic block, i.e. an absorber, provided either above or under the base of the optical disk drive. According to the vibration theory, when the elastic block has a natural frequency that is equal to the harmonic frequency of the base in vibration, the base has a displacement of zero. That is, the elastic block absorbs vibration due to the base.

FIG. 1 shows a conventional dynamic vibration absorber commonly used in the optical disk drive. In FIG. 1, a plurality of dampers 12a is elastic members, and is provided between the block 10a and the base 11a. A plurality of vibration absorbing dampers 13a is damping components and provided between the base 11a and the base supporting device. In this case, the dynamic vibration absorber significantly reduces vibration of the optical disk drive.

However, in the conventional dynamic vibration absorber, the dampers 12a and the vibration absorbing dampers 13a are different shapes and of different materials, which is not preferable in consideration of cost and manufacture of the optical disk drive. Consequently, there is a need to develop a dynamic vibration absorbing apparatus for the optical disk drive without the above-mentioned disadvantages.

SUMMARY OF THE INVENTION

It is an object of the present invention to provide a dynamic vibration absorbing apparatus that can reduce vibration and noise in the optical disk drive at high rotational speeds due to imbalance of the optical disk, in which the dynamic vibration absorbing apparatus can be easily manufactured and constructed.

It is another object of the present invention to provide a dynamic vibration absorbing apparatus for an optical disk drive. The present invention has a first plate, a second plate provided either above or under the first absorbing plate, a plurality of first plate supporting devices, and a plurality of vibration absorbing dampers, in which each of the vibration absorbing dampers is secured in the corresponding first plate supporting devices and the first plate and the second plate are coupled to the absorbing damper.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE INVENTION

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Although the principles of the present invention are described below in connection with cover-lifting type of optical disk drive, the present invention can be applied to all optical disk drive, including but not limited to CD drives, DVD-ROM/DVD-RAM/DVD-RW drives and combo drives (DVD-ROM+CD-RW), etc.

An embodiment of the dynamic vibration absorbing apparatus for use in an optical disk drive of the present invention is hereinafter described with reference to FIGS. 2 and 3.

Figure 1:
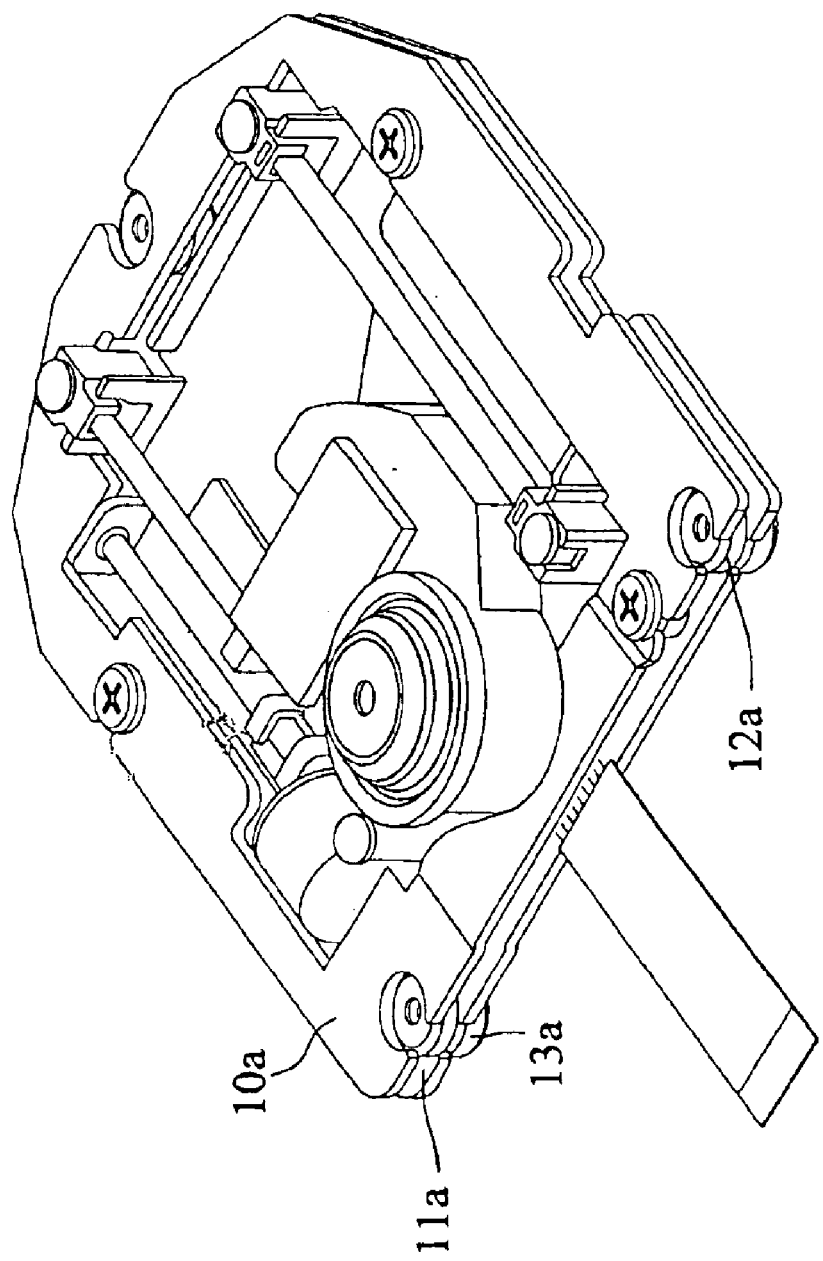
FIG. 1 is a perspective view showing the conventional dynamic vibration absorber.
Figure 2:
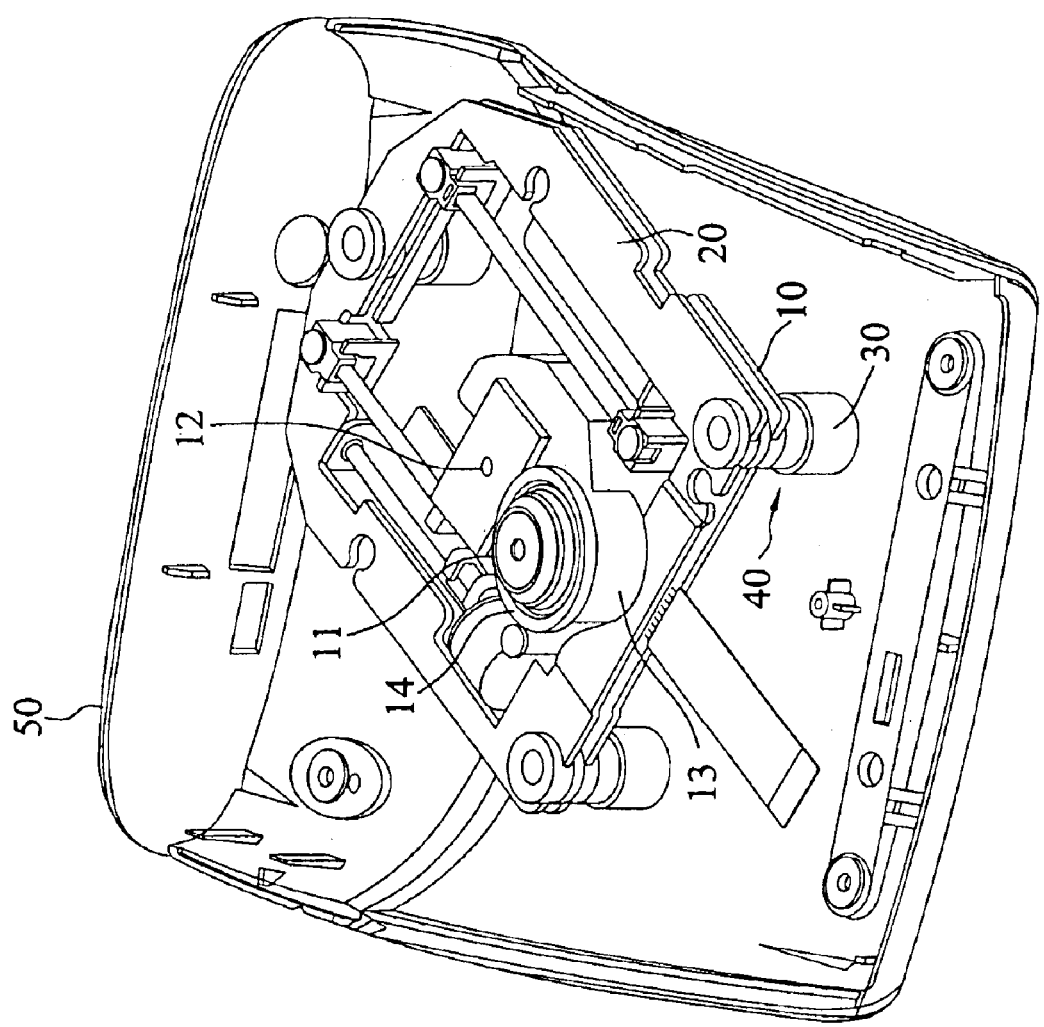
FIG. 2 is a perspective view showing a dynamic vibration absorbing apparatus for an optical disk drive with a top cover removed according to the present invention.
Figure 3:
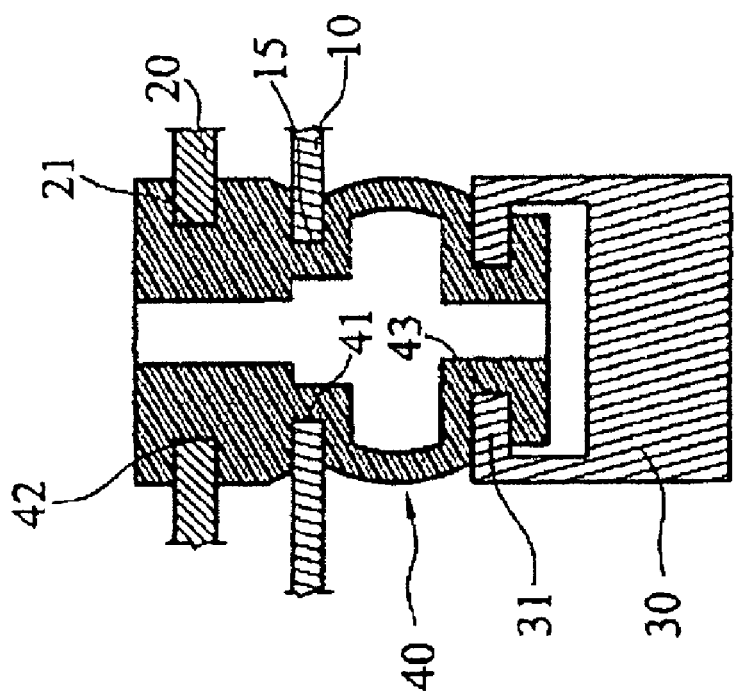
FIG. 3 is a cross-section of one embodiment according to the present invention of FIG. 2.

As best shown in FIGS. 2 and 3, the dynamic vibration absorbing apparatus has a first plate 10, a second plate 20, a plurality of first plate supporting devices 30 and a plurality of vibration absorbing dampers 40. These components are provided within the housing 50 of the optical disk drive. A disk rotating unit 11 and an optical pickup 12 is provided at the first plate 10 (i.e. the data reading device, or the MECHA). The disk rotating unit 11 includes a spindle motor 13 and a turntable 14. When an optical disk is inserted into the optical disk drive, the spindle motor 13 drives the turntable 14 to rotate the optical disk positioned on the turntable 14, so that the optical pickup 12 can read data stored in the optical disk. Further, a plurality of first connecting holes 15 for connecting the vibration absorbing dampers 40 is defined in the first plate 10.

The second plate 20 is provided either above or under the first plate 10, and can be made in any particular shape according to the mechanism arrangement in the optical disk drive. Further, the second plate 20 has defined a plurality of second connecting holes 21 for connecting the vibration absorbing dampers 40.

Each of the first plate supporting devices 30 is fixed in the housing 50 for supporting the first plate 10 and the second plate 20. It is preferable that the first plate supporting devices 30 is integrally formed with the housing 50. Alternately, each of the first plate supporting devices 30 is independently manufactured and installed to the housing 50. A first connecting hole 15 of the first plate 10 and a second connecting hole 21 of the second plate 20 are secured to the corresponding first plate supporting device 30. Further, each of the first plate supporting devices 30 has defined an engaging portion 31 as shown in FIG. 3.

The vibration absorbing dampers 40 are made of a resilient material such as rubber. Each of the vibration absorbing dampers 40 is substantially a hollow cylinder. Further, each of the vibration absorbing dampers 40 has defined a first groove 41, a second groove 42 and a third groove 43, in which the second groove 42 is provided above the first groove 41, and the third groove 43 is provided under the first groove 41. Each of the vibration absorbing dampers 40 is secured to the corresponding first plate supporting devices 30 with the third groove 43. Meanwhile, the first plate 10 and the second plate 20 are coupled to the absorbing damper 30 with the first groove 41 and the second groove 42, respectively.

Furthermore, each of the vibration absorbing dampers 40 is positioned through a corresponding first connecting hole 15 of the first plate 10 and a corresponding second connecting hole 21 of the second plate 20, in which the first groove 41 of the vibration absorbing damper 40 is engaged to the corresponding first connecting hole 15 and the second groove 42 of the vibration absorbing damper 40 is engaged to the corresponding second connecting hole 21. Thus, the first plate 10 and the second plate 20 are connected with the vibration absorbing dampers 40.

Further, each of the engaging portions 31 of the first plate supporting device 30 is fitted into a corresponding third groove 43 of a vibration absorbing damper 40, so that the vibration absorbing damper 40 is secured to the first plate supporting device 30. Thus, the first plate 10 and the first plate supporting devices 30 are connected with the vibration absorbing dampers 40.

Another embodiment of the dynamic vibration absorbing apparatus for an optical disk drive of the present invention is hereinafter described with reference to FIGS. 2 and 4.

Figure 4:
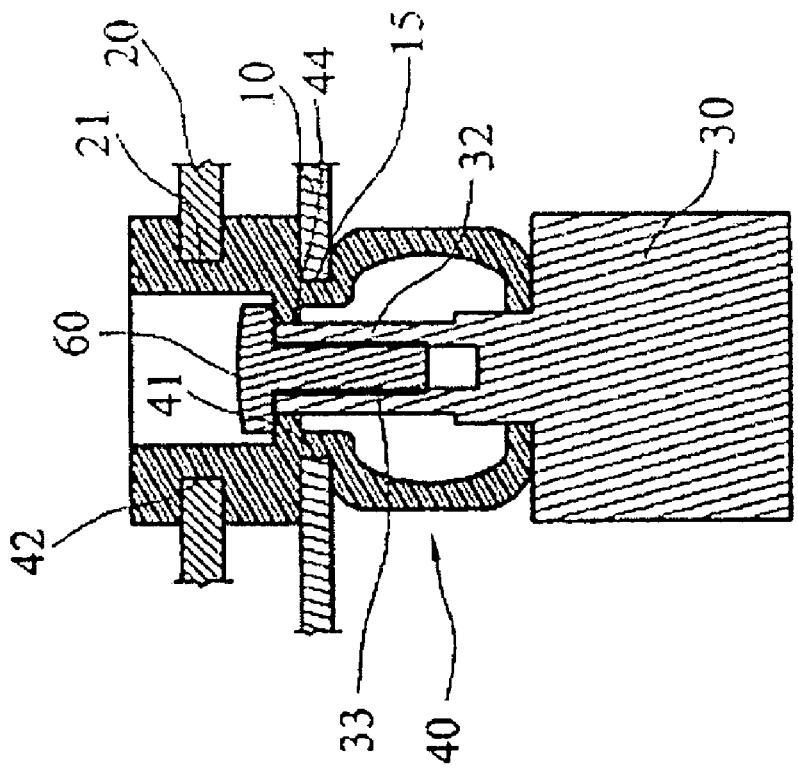
FIG. 4 is a cross-section of another embodiment according to the present invention of FIG. 2.

Referring to FIGS. 2 and 4, the dynamic vibration absorbing apparatus for use in the optical disk drive has shown another embodiment. In this embodiment, however, each of the vibration absorbing dampers 40 has defined a first fixing hole 44. Further, a fixing rod 32 is integrally formed with each of the first plate supporting devices 30. A second fixing hole 33 is defined in the fixing rod 32 thereon and sized to receive a screw 60.

Therefore, each of the vibration absorbing dampers 40 is fixed on a corresponding first plate supporting device 30 by extending the screw 60 through the second fixing hole 33 of the fixing rod 32 of the vibration absorbing damper 40. Thus, the first plate 10 and the first plate supporting devices 30 are connected with the vibration absorbing dampers 40.

With the dynamic vibration absorbing apparatus for an optical disk drive of the present invention, the vibration absorbing dampers 40 are applied to connect the first plate 10, the second plate 20 and the first plate supporting devices 30. Further, the elastic coefficient of the vibration absorbing dampers 40 can be adjusted by changing the thickness, shape and the area in cross-section of the vibration absorbing dampers 40. Thus, when the second plate 20 has a natural frequency equal to the harmonic frequency of the first plate 10 in vibration, damping between the first plate 10 and the first plate supporting devices 30 can be automatically adjusted, and the second plate 20 absorbs vibration due to the imbalance from the first plate 10, so that the first plate 10 has a displacement of zero.

The invention discloses a dynamic vibration absorbing apparatus for the optical disk to reduce vibration at high rotational speeds due to imbalance of the optical disk, with a relatively reduced cost, in which all of the vibration absorbing dampers 40 are made of the same material so that the dynamic vibration absorbing apparatus can be easily manufactured and assembled.

While the present invention has been described with reference to the preferred embodiments thereof, it is to be understood that the invention is not limited to the described embodiments or constructions. On the contrary, the invention is intended to cover various modifications and similar arrangements as would be apparent to those skilled in the art. Therefore, the scope of the appended claims should be accorded the broadest interpretation so as to encompass all such modifications and similar arrangements.

What is claim is:

1. A dynamic vibration absorbing apparatus for an optical disk drive, comprising:

a first plate having a plurality of first connecting holes;

a second plate having a plurality of second connecting holes;

a plurality of first plate supporting devices;

a fixing rod provided at each of the first plate supporting devices and the fixing rod provided with a first fixing hole thereon; and a plurality of vibration absorbing dampers, wherein each of the vibration absorbing dampers is provided with a second fixing hole and secured to the corresponding first plate supporting devices, and each of the vibration absorbing dampers has defined a first groove and a second groove;

wherein each of the vibration absorbing dampers is positioned through a corresponding first connecting hole and a corresponding second connecting hole, wherein the first groove of the vibration absorbing damper is engaged to the corresponding first connecting hole and the second groove of the vibration absorbing damper is engaged to the corresponding second connecting hole, and each of the vibration absorbing dampers is fixed on a corresponding first plate supporting device by extending a screw through the first fixing hole of the fixing rod.

2. The dynamic vibration absorbing apparatus for an optical disk drive according to claim 1, wherein the first plate supporting devices are adapted to be fixed to a housing of the optical disk drive.

3. The dynamic vibration absorbing apparatus for an optical disk drive according to claim 1, wherein the vibration absorbing dampers are hollow dampers.

* * * * *